May 21, 1957  H. LOHR  2,792,710
INSPECTION GLASS FOR LIQUID LEVEL INDICATORS
Filed Nov. 27, 1953
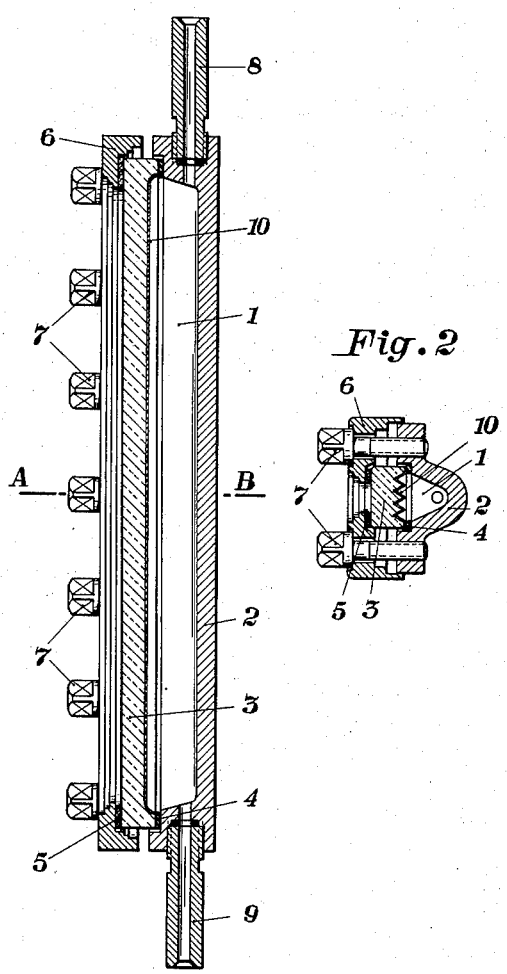
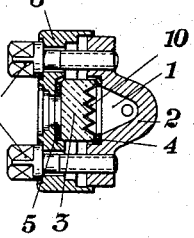
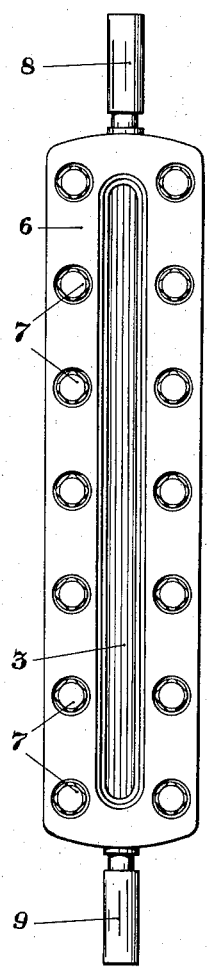
INVENTOR.
H. Lohr
BY Hascock Downing & Seebold
Attys.

United States Patent Office 2,792,710
Patented May 21, 1957

2,792,710
INSPECTION GLASS FOR LIQUID LEVEL INDICATORS

Hubert Lohr, Gumpoldskirchen, near Vienna, Austria

Application November 27, 1953, Serial No. 394,852

Claims priority, application Austria December 2, 1952

1 Claim. (Cl. 73—330)

The invention relates to inspection glasses for liquid level indicators. According to the invention, for the purpose of protection against alkaline liquids, at least that surface of the glass which is wetted by liquid is provided with a transparent coating, known per se, of a metal oxide, more especially vanadium oxide or tantalum oxide. In this manner, the life of the inspection glasses is considerably increased. The invention has recognised that the boiler feed water flowing through the inspection glass becomes weakly alkaline as a consequence of most of the softening agents, and this results in silicates being dissolved out of the inspection glass. As a result, the effective life of such glasses is very considerably reduced. If now the inspection glasses are provided with a coating of metal oxide in accordance with the invention for the purpose of protection against such alkaline liquids, it is possible to obtain a surprising increase in the effective life of such inspection glasses. Tests carried out over a relatively long period have shown that according to the nature of the metal oxide which is used, the chemical action on the glass is reduced to half to a quarter as compared with normal glasses without coating. Installations equipped with such inspection glasses accordingly remain substantially longer in a condition ready for use without repairs than the hitherto known inspection glasses.

Such coatings may serve not only for protection against chemical action, but also against mechanical action. The latter is, for example, the case when the liquid level is subjected to frequent and strong fluctuations, it having been shown by experience that this affects the glasses of liquid level indicators.

As coating methods, there may be mainly considered any of those known processes which are in the position to produce a sufficiently thin film of good adhesive power, that is to say, a process in which it is vaporized or a cathodic atomisation in high vacuum, whereas electrolytic depositions would be less suitable. Normally, it is sufficient to coat those surfaces of the inspection glass which are wetted with liquid. However, if it represents a simplification during the coating, the glass may also be provided on its entire surface with the protective coating.

The invention is illustrated by way of the accompanying drawing, in which a water level indicator for vessels or other containers is shown.

Fig. 1 is a longitudinal section,
Fig. 2 a cross section along the line A—B of Fig. 1 and
Fig. 3 is a front view.

The steam and water chamber 1 in the rear part 2 is covered by a so-called reflection glass 3 which is fixed by screws 7 with a packing 4 and an asbestos member 5 between the front part 6 and the rear part 2. Both branches 8 and 9 screwed into the rear part 2 are to be inserted in cock heads.

According to the invention the surface of the inspection glass 3 wetted by the liquid is provided with a transparent coating 10 of a metal oxide, particularly of vanadium oxide or tantalum oxide, for the purpose of protecting against alkaline liquids.

I claim:

As an article of manufacture, a liquid level indicator having a liquid chamber, an inspection glass forming the wall of said chamber, the surface of the glass that is exposed to the liquid being coated with a thin adhering film of a transparent metal oxide wetted by water, the oxide having a greater resistance to corrosion by weak alkaline aqueous solutions than a glass without a coating.

References Cited in the file of this patent

UNITED STATES PATENTS

| | | |
|---|---|---|
| 1,227,196 | Pocock | May 22, 1917 |
| 2,478,817 | Gaiser | Aug. 9, 1949 |
| 2,480,070 | Yoder | Aug. 23, 1949 |
| 2,564,706 | Mochel | Aug. 21, 1951 |
| 2,633,023 | VanHam | Mar. 31, 1953 |